(12) United States Patent
Molisch et al.

(10) Patent No.: US 7,826,853 B2
(45) Date of Patent: Nov. 2, 2010

(54) COOPERATIVE BASE STATIONS IN WIRELESS NETWORKS

(75) Inventors: Andreas F. Molisch, Arlington, MA (US); Lun Dong, Philadelphia, PA (US); Philip V. Orlik, Cambridge, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 630 days.

(21) Appl. No.: 11/934,131

(22) Filed: Nov. 2, 2007

(65) Prior Publication Data
US 2009/0117911 A1 May 7, 2009

(51) Int. Cl.
*H04W 72/00* (2009.01)
(52) U.S. Cl. ............ 455/450; 455/451; 455/452.2; 455/453; 455/509; 370/329; 370/341; 370/431; 370/437
(58) Field of Classification Search ............ 455/450, 455/451, 452.2, 453, 509–513; 370/329, 370/341, 431, 437
See application file for complete search history.

(56) References Cited

U.S. PATENT DOCUMENTS 7,113,808 B2 * 9/2006 Hwang et al. ............ 455/562.1
2006/0056534 A1 * 3/2006 Ionescu et al. ............ 375/267
2008/0247488 A1 * 10/2008 Li et al. ............ 375/299
2010/0002643 A1 * 1/2010 Han et al. ............ 370/329

OTHER PUBLICATIONS

Zhang: "On the Fundamentally Asynchronous Nature of Interference in Cooperative Base Station Systems," Jun. 2007.

* cited by examiner

*Primary Examiner*—Wayne Cai
(74) *Attorney, Agent, or Firm*—Dirk Brinkman; Gene Vinokur

(57) ABSTRACT

The embodiments of the invention provide an adaptive method for base station cooperation in a wireless network. In a multi-user communications network that includes base stations, and in which each base station is associated with a cell, and in which each cell includes one or more mobile stations, each base station determines pre-coding matrices for full-cooperation, semi-cooperation and non-cooperation. Each base stations also determines a sum rate $SR_{full}$ for full-cooperation, a sum rate $SR_{semi}$ for semi-cooperation, and a sum rate $SR_{non}$ for non-cooperation. Then, each base station selects the pre-coding for full-cooperation, the pre-coding matrices for semi cooperation, or the pre-coding matrices for non cooperation. Each base station transmits signals according to the selected pre-coding matrices.

14 Claims, 7 Drawing Sheets

COOPERATIVE BASE STATIONS IN WIRELESS NETWORKS

FIELD OF THE INVENTION

This invention relates generally to wireless communications, and more particularly to cooperative base stations in cellular networks.

BACKGROUND OF THE INVENTION

In a conventional non-cooperative cellular network, base stations (BSs) and mobile stations (MSs or 'users') in a cell communicate signals without considering stations and mobile stations in adjacent cells. Because the cells can overlap and the RF spectrum is shared, signals in adjacent cells can interfere with each other, particularly at mobile stations.

Therefore, wireless cellular networks are usually interference-limited because the power of interfering signals is much larger than the power of noise, and spectral efficiency gains are limited by intercell co-channel interference (CCI).

The resulting interference could be reduced by appropriate versions of multiple access (MA) schemes such as TDMA, FDMA and CDMA, e.g., by re-using frequency bands not used in every cell. However, those schemes decrease the spectral efficiency of the network. If the BSs cooperate by concurrently transmitting signals for different MSs, then the spectral efficiency of the network can be improved. However, the improved spectral efficiency in BS cooperation requires additional overhead, because the BSs need to exchange information for the cooperation to be effective. Typically, a network backbone or infrastructure is used to exchange this information. Different types of cooperation can be used, depending on whether channel state information (CSI) and data, or the different users are available at the BSs.

In the following, to give a concrete example of a system, BS cooperation in WiMax networks (Worldwide Interoperability for Microwave Access) is described. WiMAX is based on the IEEE 802.1.6e standard. As an alternative to wired broadband like cable and DSL, WiMAX is intended to provide high-speed broadband communication via a wireless channel. The radius of a typical WiMAX cell is expected to be about three to tell kilometers, with a deliver capacity of up to 40 Mbps per channel. WiMAX uses orthogonal frequency division multiplexing (OFDM).

SUMMARY OF THE INVENTION

The embodiments of the invention provide an adaptive method for base station cooperation in a wireless network. In a particular embodiment, the network uses orthogonal frequency division multiplexing. However, it should be understood that the invention can also be used with other modulation and multiple access techniques.

In a multi-user communications network that includes base stations, and in which each base station is associated with a cell, and in which each cell includes one or more mobile stations, each base station determines pre-coding matrices for full-cooperation, semi-cooperation and non-cooperation. Each base stations also determines a sum rate $SR_{full}$ for full-cooperation, a sum rate $SR_{semi}$ for semi-cooperation, and a sum rate $SR_{non}$ for non-cooperation.

Then, each base stations determines if $(SR_{full}-SR_{semi})/SR_{semi}$ is greater than a predetermined threshold $T_{full}$, and if true selects the pre-coding for full-cooperation, otherwise if false, determines if $(SR_{semi}-SR_{non})/SR_{non}$ is greater than a predetermined threshold $T_{semi}$, and if true selects the pre-coding matrices for semi cooperation, and otherwise, if false, selects the pre-coding matrices for non cooperation.

Subsequently, each base station transmits signals according to the selected per-coding matrices.

DETAILED DESCRIPTION OF THE PREFERRED EMBODIMENT

Network Model

Figure 1:
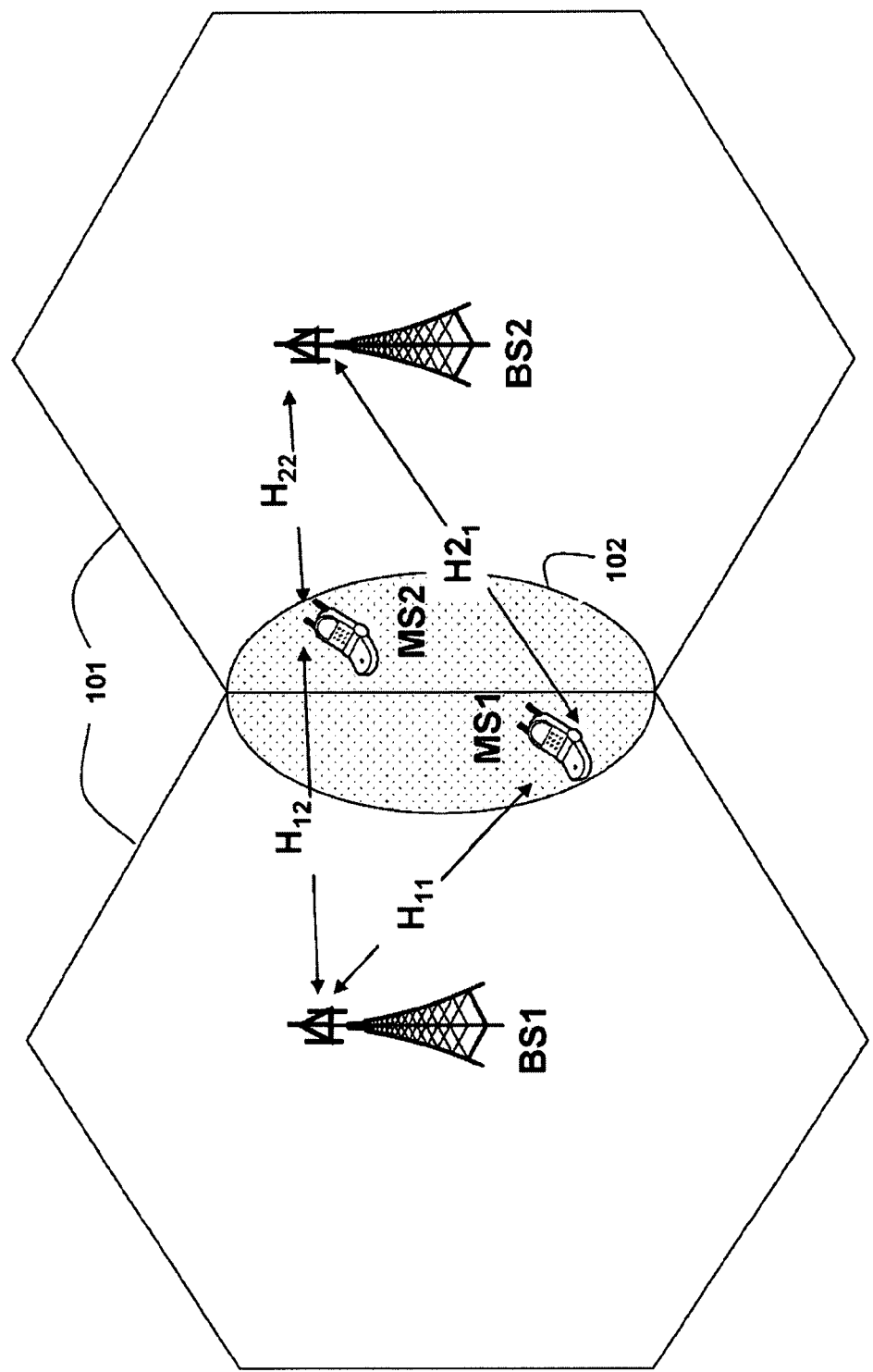
FIG. 1 is a schematic of a wireless network with overlapping cells according to an embodiment of the invention.

FIG. 1 shows a cellular network according to an embodiment of our invention. The network has at least two adjacent cells 101. The network has B base stations (B=2 in the example, BS1 and BS2). Each BS has N, antennas. There are K mobile stations (K=2 in the example, MS1 and MS2) in the cellular network. Each MS has $N_r$ antennas. With base station cooperation, multiple BSs can collaboratively transmit $L_k$ data streams to the $MS_k$ in a general area 102. If the base station does not cooperate, the signals might interfere at mobile stations. The interference is especially significant in the interference zone 102 where cells overlap.

Notation

To describe the embodiments of our invention, we use the following notations. $I_K$ is an K×K identity matrix. $0_{m×n}$ is an m×n matrix with all-zero entries. $A^\dagger$ is the Hermitian transpose of the matrix A. The determinant of a matrix is |•|, and Tr{A} is the trace (sum of the elements on the main diagonal) of the matrix A. E{•} is the expectation operation.

FIG. 1 shows a simple BS cooperation scenario with two BSs and two MSs. We define $H_{bk}(N_r×N_l)$ as baseband channel matrices between the $BS_b$ and the $MS_k (H_{11}, H_{12}, H_{21}, H_{22})$ A singular-value decomposition (SVD) of $H_{bk}$ is $$H_{bk}=U_{bk}\kappa_{bk}V^\dagger_{bk}.$$

$BS_k$ is nearest to $MS_k$. The transmit vector x from $BS_b$ to $MS_k$ is linearly pre-coded by a $N_t×L_k$ pre-coding matrix $T_{bk}$ as $$x_{bk}=T_{bk}s_k(m),$$

where $s_k(m)$ is the zero-mean data (signal) vector of size $L_k×1$ at time m for the $MS_k$.

Figure 2:
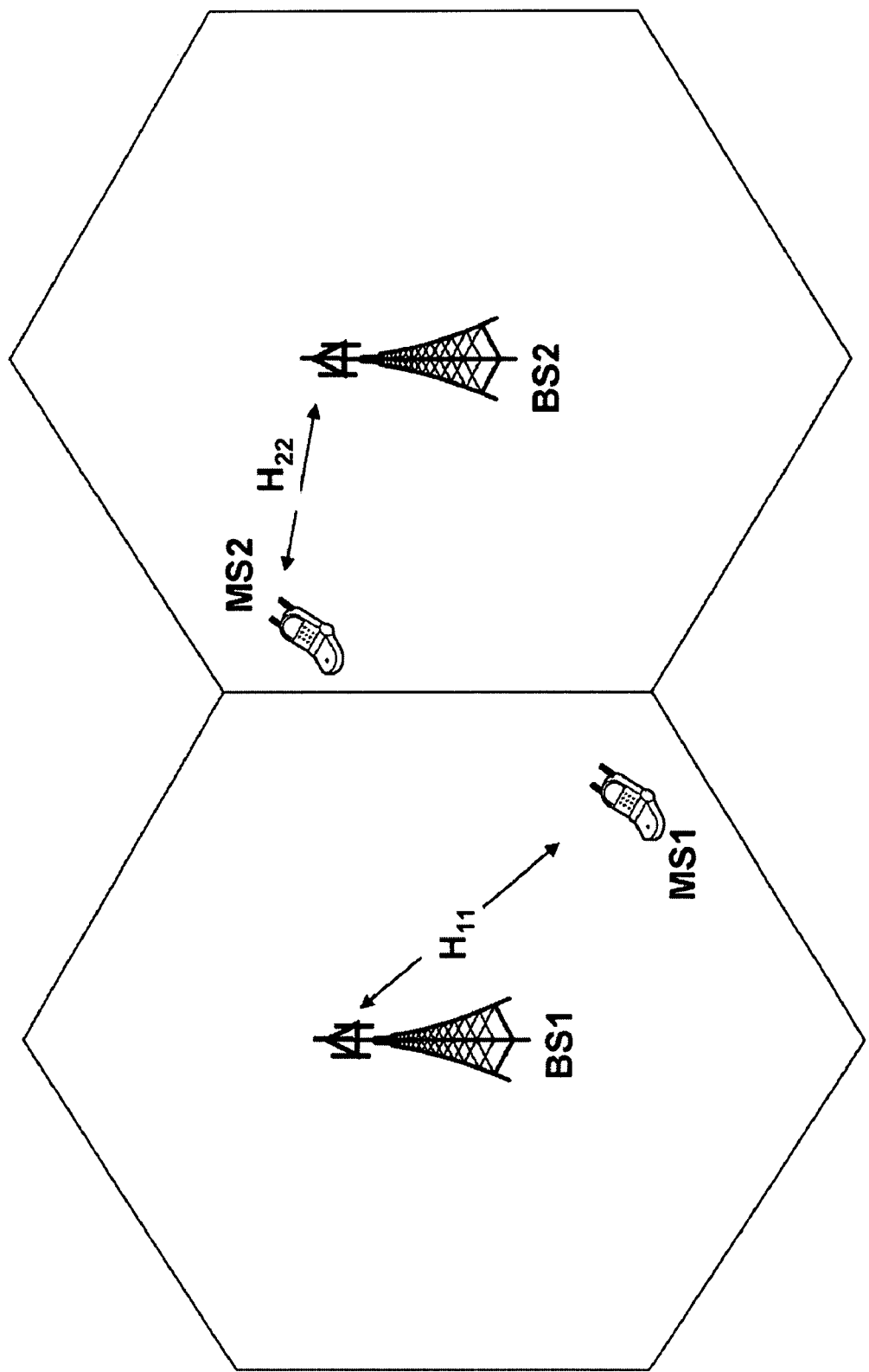
FIG. 2 is a schematic of a prior wireless network in which each base station only communicate with mobile stations within its cell.

FIG. 2 shows a conventional network, in which each BS communicates only with the MSs in its own MS, and the pre-coding matrix $T_{bk}=0_{Nl×Lk}$ for b≠k.

The orthoganlly modulated signal to be transmitted can use precoding. Pre-coding in OFDM based networks disperses the energy of symbols over the available bandwidth of the channel. That is, pre-coding restores the frequency diversity that may have been lost due to an IDFT that is used to transform the input signal to a time domain signals, which generates a complex-valued baseband signal.

A common pre-coding matrix is the Walsh-Hadamard matrix, which uniformly spreads the symbol energy across the channel bandwidth using orthogonal spreading sequences. We maximize the information rate for each MS using a Gaussian code book for pre-coding the transmit data vectors, with normalized power such that $$E\{s_k(m)s_k(m)^\dagger\}=I_{Lk}, \text{ and}$$

$$E\{s_k(m)s_l(m)^\dagger\}=0_{Lk \times Lk} \text{ (for } k \neq l\text{)}.$$

Because different orthogonal subcarriers are allocated to the intra-cell MSs in WiMax networks, intra-cell interference can be minimized. We assume in the following that the signals are synchronous.

The received signal at $MS_k$ is given by $$y_k(m) = \sum_{b=1}^{B} H_{bk} x_{bk}(m) + \sum_{\substack{j=1\\j \neq k}}^{K} \sum_{b=1}^{B} H_{bk} x_{bj}(m) + n_k(m) \quad (1)$$

$$= \sum_{b=1}^{B} H_{bk} T_{bk} s_k(m) + \sum_{\substack{j=1\\j \neq k}}^{K} \left(\sum_{b=1}^{B} H_{bk} T_{bj}\right) s_j(m) + n_k(m),$$

where $n_k(m)$ is additive white Gaussian noise (AWGN) vector with a covariance matrix $N_0 I_{N_r}$. Equation (1) can be rewritten as $$y_k(m) = H_k T_k s_k(m) + \sum_{\substack{j=1\\j \neq k}}^{K} H_k T_j s_j(m) + n_k(m), \quad (2)$$

where $$H \triangleq [H_{1k}, \ldots, H_{Bk}] \text{ and } T_k \triangleq [T_{1k}^\dagger, \ldots, T_{Bk}^\dagger]^\dagger.$$

It is an objective of the invention to generate optimal transmit pre-coding matrices $\{T_k\}_{k=1}^{K}$ that maximize the sum rates $R_k$ of all MSs, subject to a set of MS-specific power constraints. The sum rate is the combined data rates of all the mobile stations (users) in a cell. We use the sum rate as a metric of spectral efficiency. Thus, our optimization problem is $$\{T_k^{opt}\}_{k=1}^{K} = \arg\max \Sigma_{k=1}^{K} R_k, \text{ s.t. } Tr\{T_k^\dagger T_k\} \leq P_k^{tx}, \quad (3)$$
$$k=1,\ldots,K.$$

The bandwidth-normalized information rate $R_k$ of the $MS_k$ is $$R_k = \log|I_{N_r} + \Phi_k^{-1} H_k T_k T_k^\dagger H_k^\dagger|, \quad (4)$$

where $\Phi_k$ is the covariance matrix of noise plus interference for the $MS_k$. Treating the interference term as noise is a lower bound on the sum rate. The covariance matrix is $$\Phi_k = N_0 I_{N_r} + \sum_{j=1}^{K} H_k T_j T_j^\dagger H_k^\dagger. \quad (5)$$

The equivalent MIMO channel for the $MS_k$ is $\Phi^{-1/2} H_k$, with unit additive noise power.

Full/Semi/Non-cooperation

BS cooperation requires an exchange of information. We describe the following schemes depending on the amount of information the BSs exchange.

Full-cooperation

In this scheme, each BS exchanges its CSI and tile data streams with all other BSs. As a result, each BS has all data and channel state information (CSI), including the CSI and the data of all the other BSs. Then, different BSs can collaboratively and simultaneously transmit data streams intended for different MSs.

Semi-cooperation

Each BS only has the CSI of all other BSs, but not their data streams. In this scheme, each BS can only transmit data intended to its own MS, i.e., the $BS_k$ can only serve $MS_k$, and $T_{bk}=0_{Nl \times Lk}$ for b not k. However, $BS_k$ can minimize the interference to other cells based on their CSI.

Non-cooperation

In this scheme, the BSs do not exchange any information. Thus, each BS only has the CSI of the MSs in its cell. This is the normal operation mode in conventional WiMax networks. Similar to semi-cooperation, each BS can only transmit data intended to the MSs in its cell, i.e., the pre-coding matrix $T_{bk}=0_{Nl \times Lk}$ for $b \neq k$. In this scheme, the data streams might interfere with mobile stations in other cells.

Full-cooperation is most effective for reducing interference because all information is available at all the BSs. However, full-cooperation increases overhead to exchange both CSI and data. As advantage, semi-cooperation only exchanges the CSI, which requires much less overhead, compared with full-cooperation. Intuitively, semi-cooperation is a special case of full-cooperation when the MSs are very close to their own BSs. When the MSs are within range of multiple BSs, full-cooperation performs much better than semi-cooperation, see FIG. 5-6.

Pre-coding Matrices for Non-cooperation

In the non-cooperation scheme, the CSI in other cells is not available, although each BS has knowledge of the CSI of its own cell (i.e., $H_{kk}$). The pre-coding matrices, which maximizes the sum rate $R_k$, is generated according to an eigen-beam-forming and water-filling power allocation method based on the signal-to-noise ratio (SNR). Water-filling allows the average transmitted signal power on each channel to vary, while the sum of the transmitted power on all the channels remains constant. Note that the interference power is unknown because it is related to the CSI of other BSs. Therefore, the water-filling power allocation is based only on the power of the noise. Hereinafter, water-filling is synonymous with power allocation.

The eigenvectors of the input covariance matrix $T_{kk}^\dagger T_{kk}$ are the first $L_k$ columns of the matrix $V_{kk}$. Singular values of the pre-coding matrix $T_{kk}$ correspond to the water-filling power allocation. The equivalent MIMO channel is $\Phi_k^{-1/2} H_{kk}$, with unit noise power, where $$\Phi_k = N_0 I_{N_r} + \sum_{\substack{j=1\\j \neq k}}^{K} \sum_{b=1}^{B} H_{bk} T_{jj} T_{jj}^\dagger H_{bk}^\dagger. \quad (6)$$

The sum rate $R_k$ (k=1, ..., K) is $$R_k = \log|I_{N_r} + \Phi_k^{-1} H_{kk} T_{kk} T_{kk}^\dagger H_{kk}^\dagger|. \quad (7)$$

Pre-coding Matrices for Semi-cooperation

In the semi-cooperation scheme, each BS has the CSI of the links of the other BSs. This can be done by exchanging the CSI with all other BSs directly or indirectly. The optimal pre-coding matrix $T_{kk}$ uses the eigen-beam-forming and water-filling power allocation for the equivalent MIMO channel $\Phi_k^{-1/2}H_{kk}$ (with unit noise k power). Because the interference power is known, power allocation is performed based on interference-plus-noise power. Also, recall that $T_{bk}=0_{Nl\times Lk}$ because each BS only serves its own MS. We provide the following multi-user iterative water-filing scheme to obtain good solutions for generating the pre-coding matrices.

1) The starting points are provided by the solution of non-cooperation above.
2) For each k=1, ..., K, initialize the pre-coding matrix $T_{jj}$, for j≠k, and update the pre-coding matrix $T_{kk}$ according to the eigen-beam-forming and water-filling power allocation for the equivalent MIMO channel $\Phi_k^{-1/2}H_{kk}$ (with unit noise k power), where $\Phi_k$ is determined according to Equation (6).
3) Determine the sum rate $R_k$ based on Equation (7).
4) Repeat steps 2) and 3) until the sum rate $\Sigma_{k=1}^K R_k$ increases by less than a predetermined threshold $T_{sum-rate-increase}$.

The above iterative method can converge to a global optimum, which is independent of the starting points, though convergence to a local optimum might occur as well. We note that other methods for determining the precoding matrix are possible as well.

Pre-coding Matrices for Full-cooperation

In the full-cooperation scheme, each BS has all CSI and data for all other BSs. The optimal solution of the pre-coding matrix is according to the eigen-beam-forming and water-filling power allocation, in which all BSs can simultaneously communicate with all MSs, i.e., $T_{bk}\neq 0_{Nl\times Lk}$.

We determine the optimal pre-coding matrices using a "hill-climbing" scheme, U.S. patent application Ser. No. 11/408,284, "System and Method for Transmitting Signals in Cooperative Base Station Multi-User MIMO Networks," filed by Mehta et al., incorporated herein by reference.

In Mehta et al., the pre-coding matrices maximize the ratio of the power of the desired signal received by the MS and the sum of the noise and the total interference power (leakage) at all other MSs. The pre-coding matrix $T_k$ is of a scaled semi-unitary form $$T_k = \sqrt{\frac{P_t^{tx}}{L_x}} Q_k,$$

where the columns of the $BN_i \times L_k$ matrix $Q_k$ are orthonormal, i.e., $Q_k^\dagger Q_k = I_{Nr}$. The $l^{th}$ column of $Q_k^{opt}$ (the optimal $Q_k$), $q^{opt}_{lk}$, equals the $l^{th}$ eigenvector of the matrix $N_k^{-1}M_k$ corresponding to its $l^{th}$ largest eigenvalue, where $M_k = P_k^{tx} H_k^\dagger$, and $$N_k = N_0 N_r I_{BN_t} + \sum_{\substack{j=1 \\ j\neq k}}^K P_k^{tx} H_j^\dagger H_j.$$

Our method proceeds as follows:

1.1) We use the procedure of Mehta et al. to determine the pre-coding matrices $T_k(BN_i\times L_k)$ and the sum rate $R_k$. We use the solution of step 1) above for the starting points.

1.2) For each k=1, ..., k initialize the pre-coding matrix $T_j$ and update the matrix $T_k$ to the eigen-beam-forming and waterfilling power allocation for the equivalent MIMO channel $\Phi_k^{-1/2}H_k$ (with unit noise power), in which $\Phi_k$ is determine by Equation (5).

1.3) Determine the sum rate $R_k$ based on Equation (4).

1.4) Repeat steps 1.2) and 1.3) until the sum rate $\Sigma_{k=1}^K R_k$ increases by less than the predetermined threshold $T_{sum-rate-increase}$.

2) We the solution of the semi-cooperation scheme for the starting points, and follow the similar steps of 1.2)-1.4) to calculate the pre-coding matrices $T_k$, and the sum rate.

3) We compare the sum rates obtained in steps 1) and 2). The higher sum rate and the corresponding pre-coding matrices are selected as the final solutions.

BS Cooperation in WiMAX Networks

Adaptive Scheme

Figure 7:
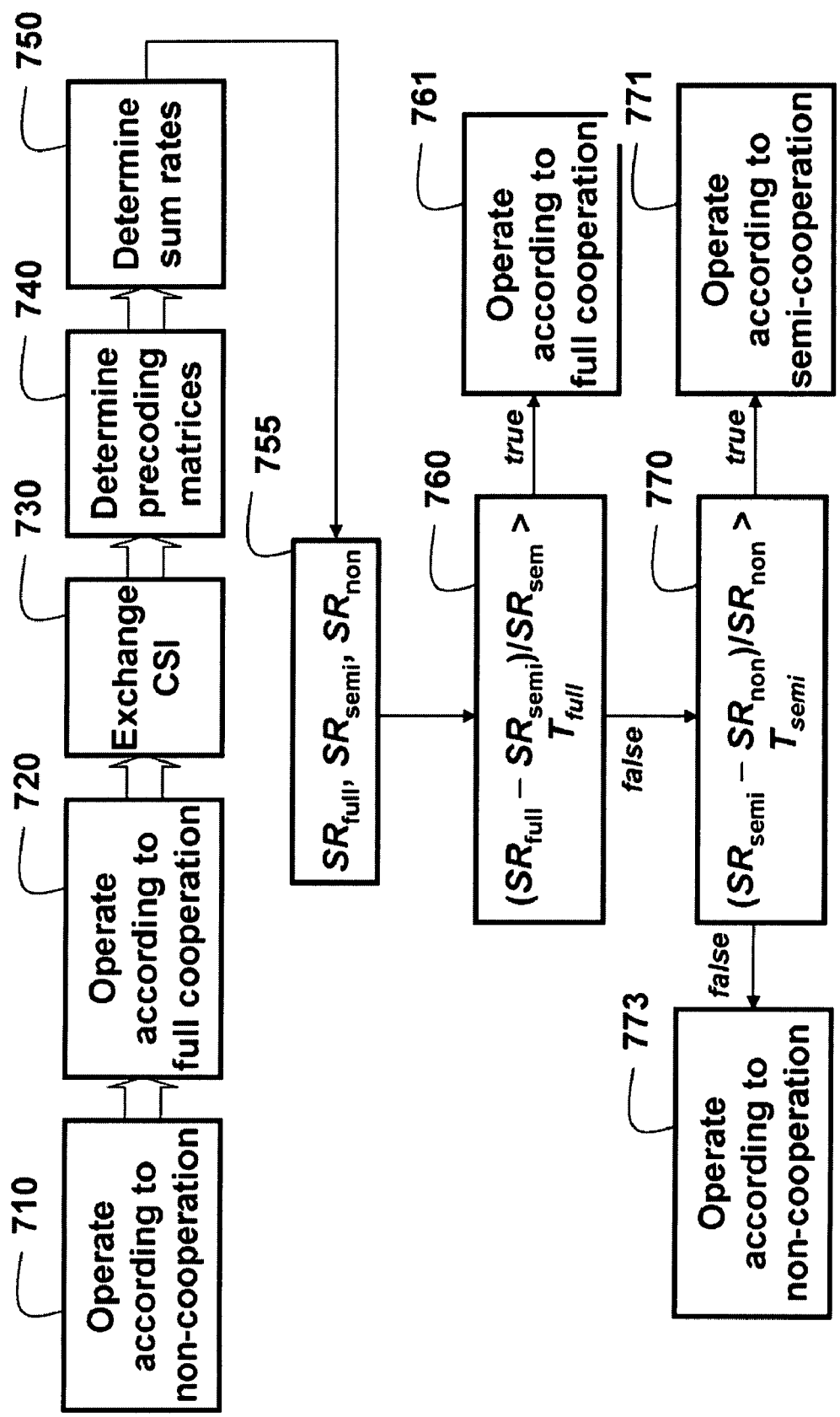
FIG. 7 is a flow diagram of an adaptive method for base station cooperation in the wireless network of FIG. 1.

As shown in FIG. 7, we provide an adaptive method to balance the gains and costs in BS cooperation. The method is as follows:

1) At initialization, the BSs operate according to the non-cooperation scheme 710.
2) The BSs exchange 730 their CSI. Each BS determines 740 independently their optimal pre-coding matrices for full-cooperation, semi-cooperation and non-cooperation. Each BS also determines 750 sum rate 755 for full-cooperation ($SR_{full}$), semi-cooperation ($SR_{semi}$) and non-cooperation ($SR_{non}$).
3) If it is true that ($SR_{full}$−$SR_{semi}$)/$SR_{semi}$ 760 is greater than a predetermined threshold $T_{full}$, then the pre-coding matrices are selected from the solution of full-cooperation 761, and the BSs exchange their CSIs and data streams. The threshold can be set by the network, and call change. Otherwise, if false, determine 770 if it is true that ($SR_{semi}$−$SR_{non}$)/$SR_{non}$ is greater than a predetermined threshold $T_{semi}$, then the pre-coding matrices are selected from the solution of semi cooperation 771. The CSI is exchanged but data are not exchanged 762. Otherwise, if false, the pre-coding matrices are selected from the solution of non cooperation 773.

Note that the sum rates cannot be obtained until the CSIs have been exchanged. Thus, we consider other techniques. For example, the CSI exchange can be performed when the MSs have inadequate quality of service (QoS). One technique takes advantage of the macro-diversity handover (MDHO) mode and/or the Receive Signal Strength indicator (RSSI) available in the MAC protocol.

Subcarrier Allocation Modes

Figure 3B:
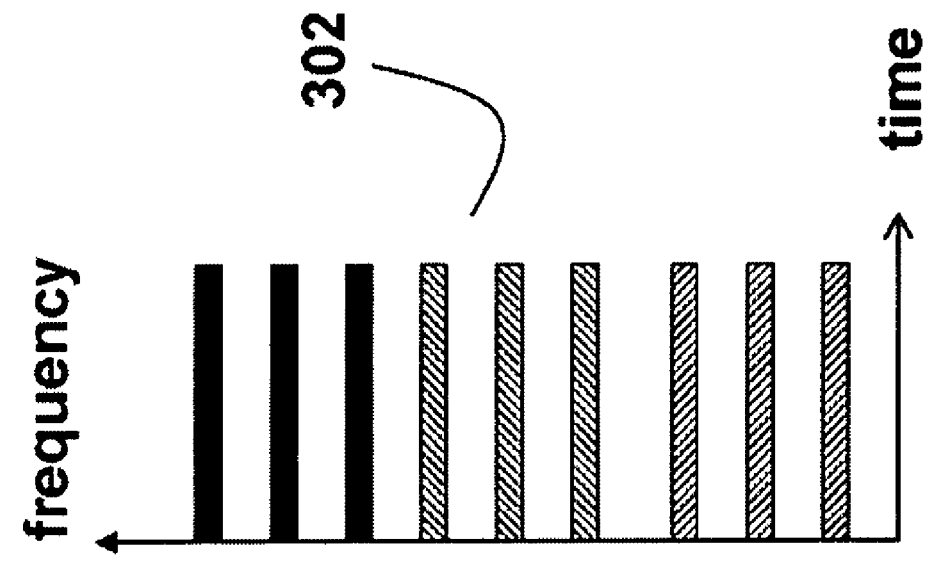
FIG. 3B is a schematic of adjacent subcarrier allocation according to an embodiment of the invention.
Figure 3A:
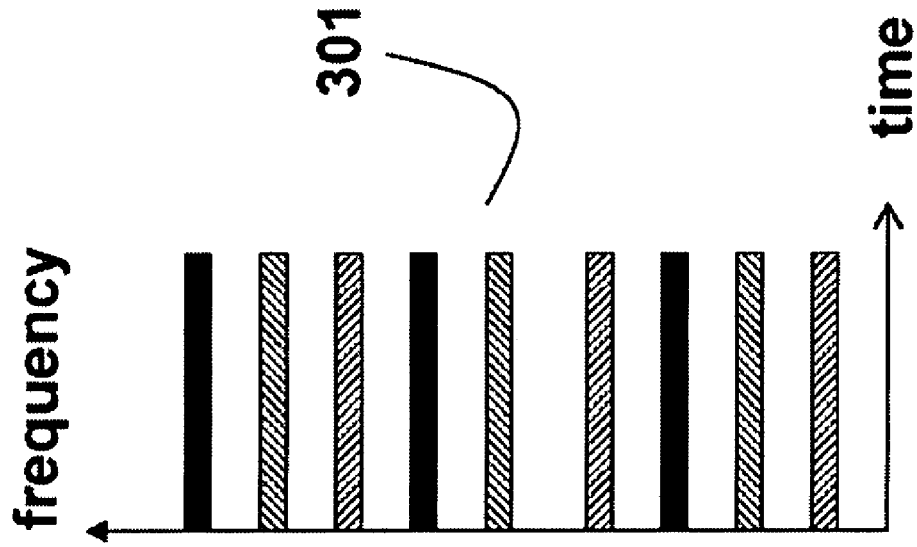
FIG. 3A is a schematic of interleaved subcarrier allocation according to an embodiment of the invention.

As shown in FIGS. 3A and 3B, WiMax networks have two resource allocation modes. FIG. 3A shows interleaved subcarrier allocation (FUSC/PUSC) 301, which exploits frequency/time frequency diversity. FIG. 3B shows adjacent subcarrier allocation (AMC) 302, which exploits multi-user diversity.

We prefer the AMC mode 302 for BS cooperation. One reason is that coefficients on different subcarriers of the same subchannel can be quite different due to frequency diversity for interleaved subcarrier allocation 301. After power allocation, it is possible that some subcarriers with weak channels are not used at all. As a result, some bits in an encoded block cannot be decoded at the receiver, which results in high bit error rate (BER).

On the other hand, there is no such problem in the AMC mode 302, because channel coefficients of adjacent subcarriers in one subchannel are highly correlated. Another reason is that the AMC mode is more likely to achieve the optimal sum rate with the help of adaptive modulation and encoding, which is the goal of our BS cooperation. However, our method can also be used with interleaved subcarrier allocation.

Generating Pre-coding Matrices

Optimally, the pre-coding matrices are generated for each subcarrier used for each OFDM symbol. However, the cost and complexity of this are extremely high.

Figure 4:
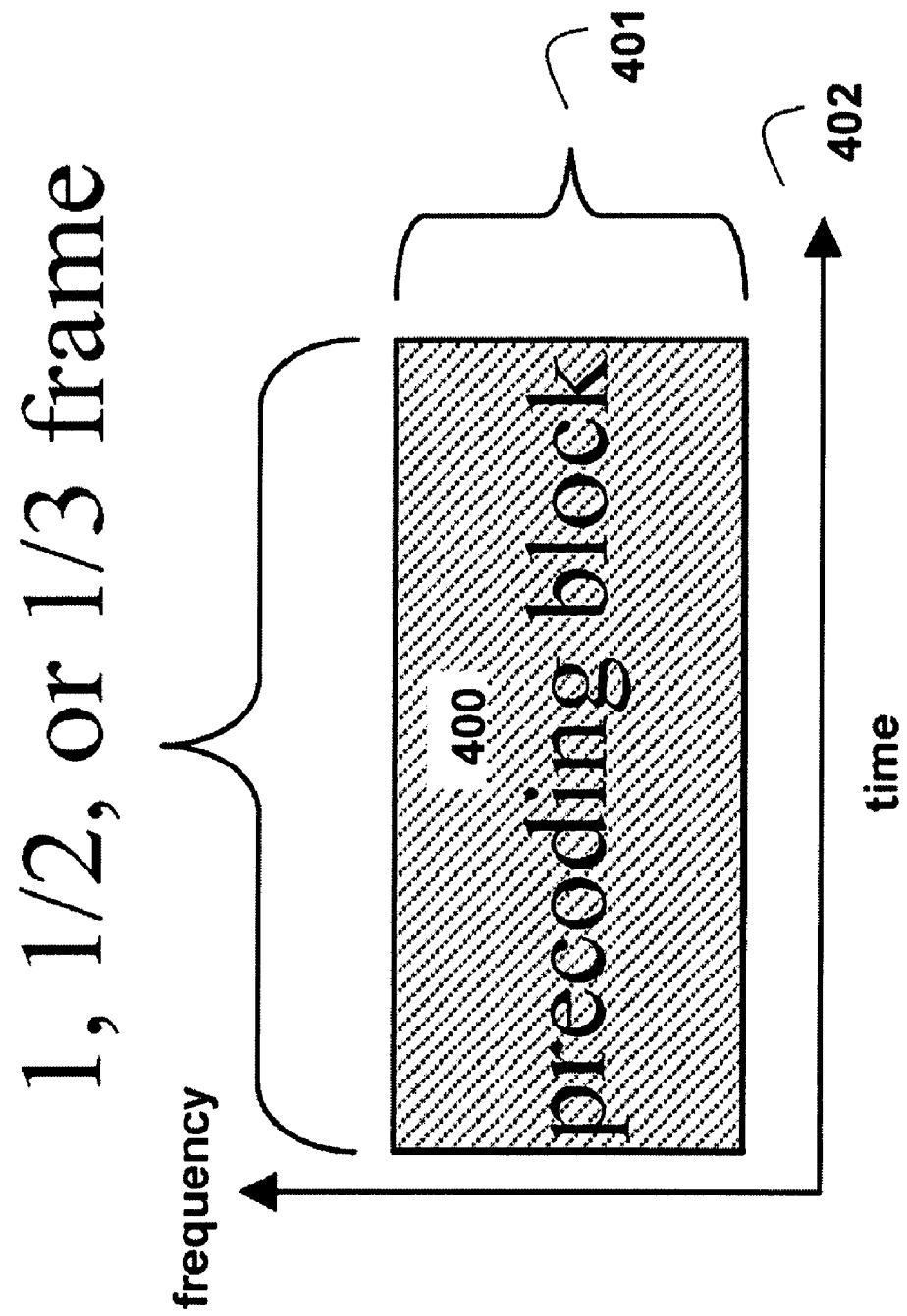
FIG. 4 is a block diagram of a pre-coding block according to an embodiment of the invention.

As shown in FIG. 4, we consider as an alternative the channel correlation in both time and frequency, and generate one pre-coding matrix for each pre-coding block 400. Therefore, the BSs exchange an average CSI for the pre-coding block. The size of the pre-coding block in the frequency domain is one subchannel 401, and includes nine subcarriers (AMC 1×6 mode), eighteen subcarriers (AMC 2×3 mode), or twenty-seven subcarriers (AMC 3×2 mode). Using averages over different-sized blocks is also possible.

The pre-coding block size in the time domain is 1, ½ or ⅓ of a frame, depending on the channel coherence time. For example, the normal down. ink frame length in WiMax is 3.3 ms. If the MS moves at a velocity of 120 km/hr, and the carrier frequency is 2.5 GHz, then the Doppler frequency is about 267 Hz corresponding approximately to an coherence time of 1.58 ms. Thus, the pre-coding block size in the time domain is selected to be ⅓ frame.

The size of the FEC block is less than or equal to the size of the pre-coding block. This ensures that all information bits in one FEC block are pre-coded by the same pre-coding matrix.

Multiple Blocks

As described above, power allocation for multiple data streams of each MS is performed according to the waterfilling method. In case of multiple blocks, i.e., multiple pre-coding matrices, for a MS, the power constraint becomes the sum power constraint among all blocks. However, the interference is still considered within each block because different blocks are orthogonal each other.

Semi-cooperation

We modify step 2) of the multi-user iterative water-filling to power allocation based on all data streams of all blocks for each MS, i.e., the power allocated to each data stream for all blocks is identical.

Full-cooperation

Power allocation is based on all data streams of all blocks for each MS, i.e., the allocated power for each data streams of all blocks is equal. Because full-cooperation may not guarantee a global convergence, we modify step 1.2) above to yield the following procedures:

1.2a) First, allocate power equally to each block. Generate pre-coding matrices for each block, in which the power allocation is independently performed in each block.

1.2b) Use the solutions of the above step 1.2a) as starting points. Perform power allocation for all data streams of all blocks, i.e., the allocated power for all data streams of all blocks is equal, and update the pre-coding matrices for each block accordingly.

Figure 5:
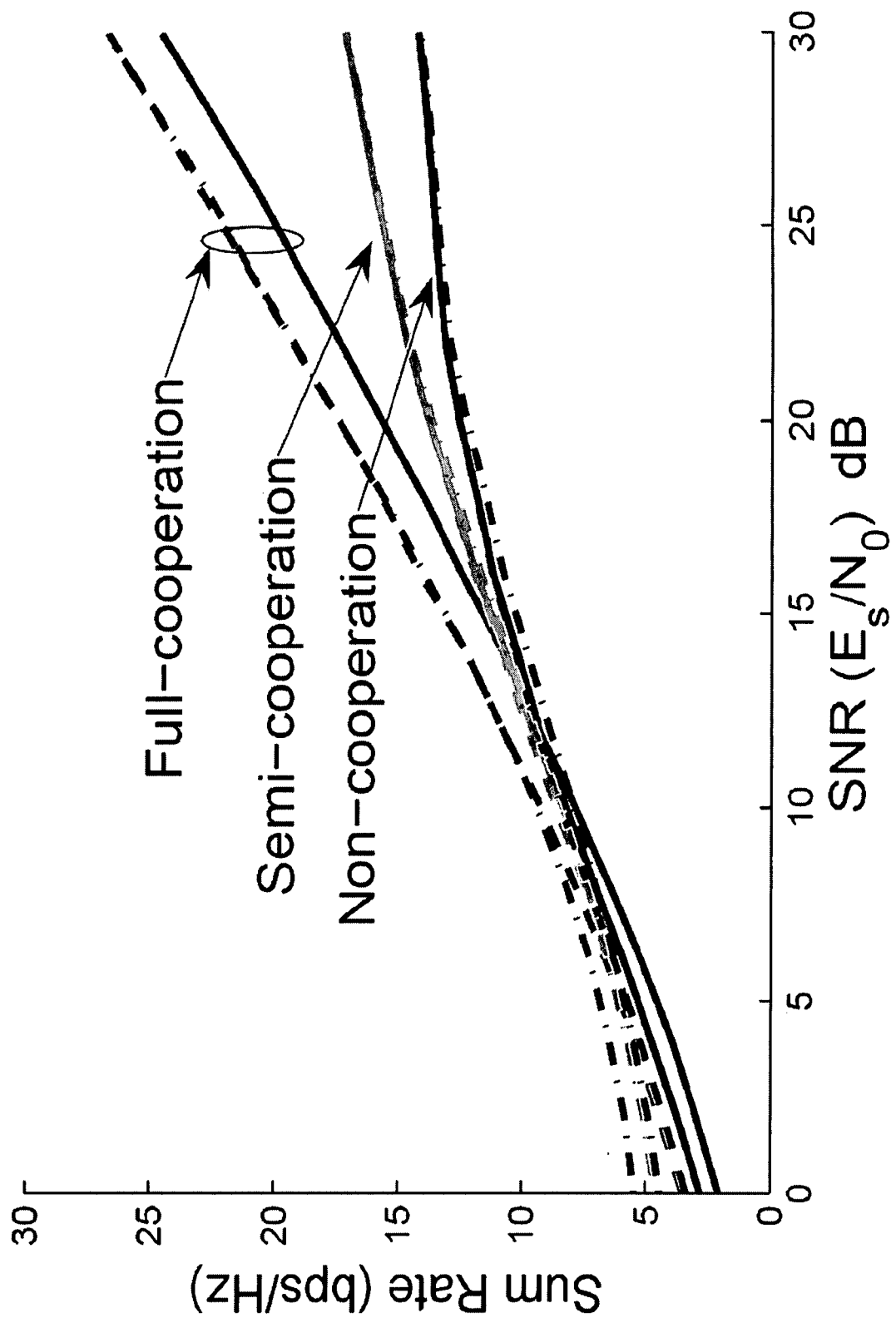
FIGS. 5 and 6 are graph comparing full-, semi- and non-cooperation of base stations according to embodiments of the invention.

FIG. 5 is a graph comparing full-, semi- and non-cooperation in terms of sum rate and SNR for an example network with Rayleigh flat fading channels. The solid lines show the sum rate under imperfect channels. Pre-coding matrices are generated based on imperfect channels, and the sum rates are determined based on perfect channels. The dashed lines show the ideal sum rate under perfect channels. Both pre-coding matrices and the sum rates are calculated based on perfect channels. The dot-dashed lines show the sum rate based on imperfect channels. Both pre-coding matrices and the sum rates are calculated based on imperfect channels.

With perfect channels, as expected, full-cooperation always performs best among the three schemes, and semi-cooperation performs better than non-cooperation.

For non- and semi-cooperation, the real sum rate is very close to the calculated/ideal rate, which shows that non- and semi-cooperation is robust to channel errors. Thus, in a practical network design, the calculated sum rate can be approximately considered as the real rate.

For full-cooperation, there is a gap between the real sum rate (with partial CSI) and the calculated/ideal rate. Moreover, this gap is almost constant under various SNRs. Also, the calculated sum rate is very close to the ideal one. Therefore, in a practical network design, one can consider the real sum rate roughly equal to the calculated sum rate subtracted from a pre-computed constant adjustment factor.

Figure 6:
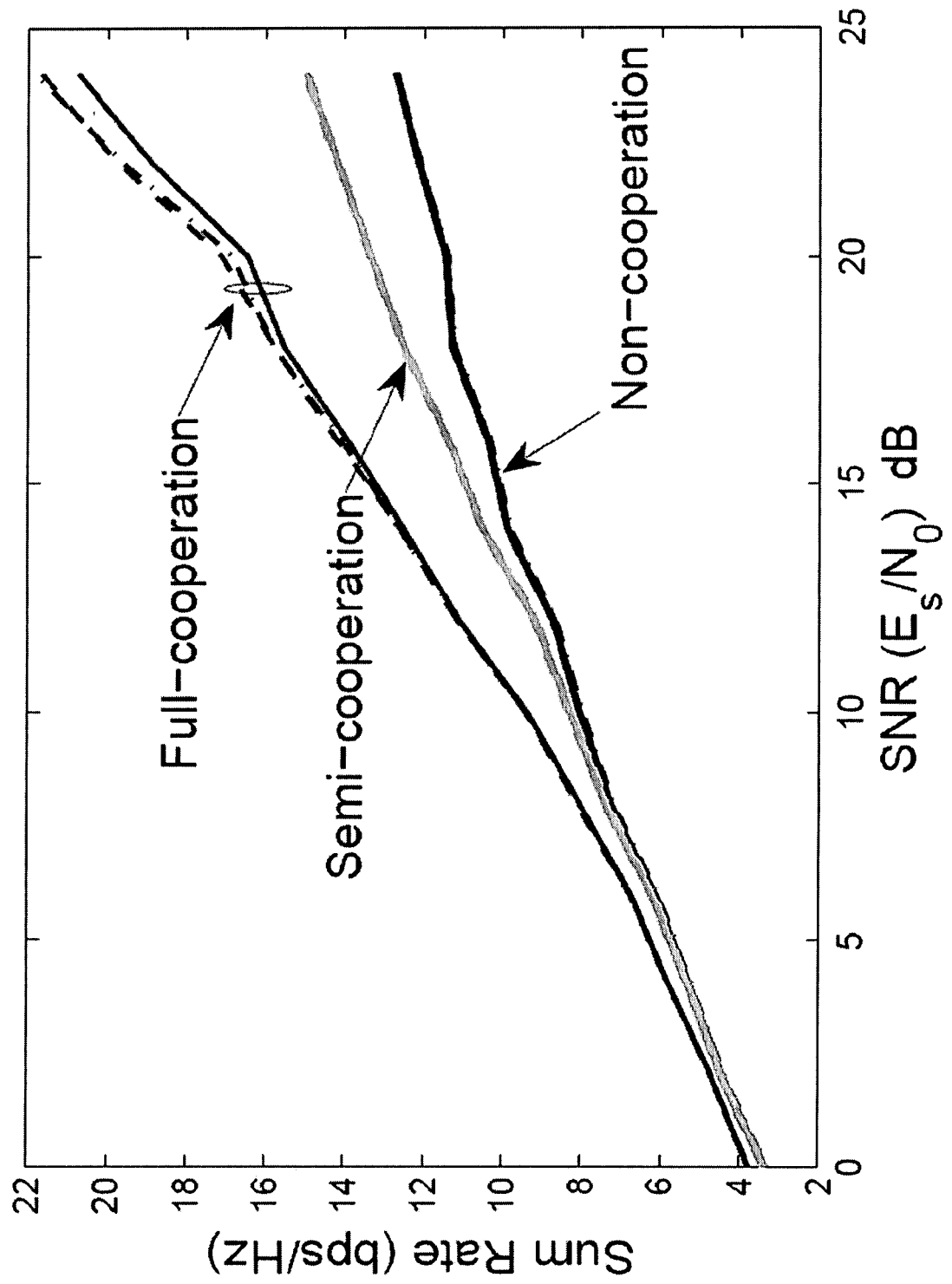

FIG. 6 compares the performance for frequency selective channels in WiMax networks. Solid lines show the real sum rate under imperfect channels. Pre-coding matrices are generated based on the imperfect average channel (average over one pre-coding block), and the sum rates are calculated based on the perfect channel on each subcarrier. The dashed lines show the ideal sum rate under perfect channels. Both pre-coding matrices and the sum rates are generated for perfect channels on each subcarrier. The dot-dashed lines show the calculated slim rate under imperfect channels. Both pre-coding matrices and the sum rates are calculated based on imperfect average channels (average over one pre-coding block).

As shown in FIG. 6, the sum rate on a per block basis is almost same as the ideal case on the basis of per subcarrier. Thus, it is indeed reasonable to use our low-complexity scheme to generate one pre-coding matrix per block, instead of per subcarrier.

From FIG. 6, one can see that for full-cooperation, unlike the gap in the flat fading scenario, the real sum rate is very close to the ideal/calculated one. In other words, both full-cooperation and semi-cooperation are quite robust to channel errors in WiMax networks. The possible reason is that in WiMax networks one pre-coding matrix is generated per block using the average CSI.

After averaging, the channel error variance of the average CSI becomes much smaller (compared with the channel error variance on each subcarrier). Also, the sum rate calculated by the perfect average CSI is very close to the ideal sum rate. Thus, the real sum rate (with very small channel error) is close to the ideal/calculated one as well. Because both full-cooperation and semi-cooperation are not sensitive to channel errors, in WiMax networks, the calculated sum rate can be approximately considered as the real one, which greatly simplifies the network design.

EFFECT OF THE INVENTION

Cooperation between base stations can improve the spectral efficiency of a wireless network. Methods for generating and pre-coding matrices for fill-cooperation, semi-cooperation, and non-cooperation maximize spectral efficiency.

The embodiments of the invention also provide an adaptive scheme for WiMax networks, in which full-cooperation is be used only it performs much better than semi-cooperation. Taking into account the particular features of the WiMax physical (PHY) layer, we use the AMC mode and generate one pre-coding matrix per block to reduce the complexity and overhead.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for transmitting signals in a multi-user communications network, in which the multi-user communications network includes a plurality of base stations, and in which each base station is associated with a cell, and in which each cell includes a plurality of mobile stations, comprising the steps of:

determining, for each of the plurality of base stations in the multi-user communications network, pre-coding matrices for full-cooperation, for semi-cooperation and for non-cooperation;

determining, for each of the plurality of base stations, a sum rate $SR_{full}$ for full-cooperation, a sum rate $SR_{semi}$ for semi-cooperation, and a sum rate $SR_{non}$ for non-cooperation;

determining, for each of the plurality of base stations, if $(SR_{full}-SR_{semi})/SR_{semi}$ is greater than a predetermined threshold $T_{full}$, and if true selecting the pre-coding for full-cooperation, otherwise if false, determining if $(SR_{semi}-SR_{non})/SR_{non}$ is greater than a predetermined threshold $T_{semi}$, and if true selecting the pre-coding matrices for semi-cooperation, and otherwise, if false, selecting the pre-coding matrices for non-cooperation; and transmitting the signals from each base station to the mobile stations in the corresponding cells according to the selected pre-coding matrices.

2. The method of claim 1, in which the determining steps are performed independently at each base station.

3. The method of claim 1, in which the cells overlap.

4. The method of claim 1, in which the pre-coding matrices are Walsh-Hadamard matrices, which uniformly spreads symbol energy of the signals using orthogonal spreading sequences.

5. The method of claim 1, in which the pre-coding matrices maximize the sum rates subject to power constraints of the mobile stations.

6. The method of claim 1, in which the signals are synchronous.

7. The method of claim 1, further comprising:
   exchanging, between the base stations, channel state information and data streams for full-cooperation; and
   exchanging only the channel state information for semi-cooperation.

8. The method of claim 7, in which the channel state information is exchanged for particular mobile stations with inadequate quality of service.

9. The method of claim 7, in which the channel state information is an average.

10. The method of claim 1, in which the pre-coding matrices are determined according eigen-beam-forming and water-filling power allocation.

11. The method of claim 1, in which the exchanging uses a receive signal strength indicator available in a media access protocol.

12. The method of claim 1, further comprising:
    allocating subcarriers for the signals to be adjacent.

13. The method of claim 1, in which there is one pre-coding matrix for each pre-coding block of the signals.

14. The method of claim 13, in which a size of the pre-coding block size in a time domain depends on a channel coherence time.

* * * * *